US012484927B2

(12) United States Patent
Nakano et al.

(10) Patent No.: US 12,484,927 B2
(45) Date of Patent: Dec. 2, 2025

(54) MEDICAL DEVICE

(71) Applicant: TERUMO KABUSHIKI KAISHA, Tokyo (JP)

(72) Inventors: Taiga Nakano, Irvine, CA (US); Kosuke Nishio, Irvine, CA (US)

(73) Assignee: TERUMO KABUSHIKI KAISHA, Tokyo (JP)

( * ) Notice: Subject to any disclaimer, the term of this patent is extended or adjusted under 35 U.S.C. 154(b) by 462 days.

(21) Appl. No.: 17/851,308

(22) Filed: Jun. 28, 2022

(65) Prior Publication Data
US 2022/0323100 A1 Oct. 13, 2022

Related U.S. Application Data

(63) Continuation of application No. PCT/JP2020/013393, filed on Mar. 25, 2020.

(51) Int. Cl.
*A61B 17/3207* (2006.01)
*A61B 17/00* (2006.01)

(52) U.S. Cl.
CPC .......... *A61B 17/320758* (2013.01); *A61B 2017/0042* (2013.01); *A61B 2217/007* (2013.01)

(58) Field of Classification Search
CPC .... A61B 17/320758; A61B 2017/0042; A61B 2217/007
See application file for complete search history.

(56) References Cited

U.S. PATENT DOCUMENTS 6,077,282 A * 6/2000 Shturman ............... F16D 43/14
606/159
8,475,484 B2 7/2013 Wulfman et al.
(Continued)

FOREIGN PATENT DOCUMENTS

| JP | H11347040 A | 12/1999 |
|---|---|---|
| JP | 2001525212 A | 12/2001 |
| JP | 2018-033571 A | 3/2018 |

OTHER PUBLICATIONS

International Search Report (PCT/ISA/210) with English translation and Written Opinion (PCT/ISA/237) mailed on Jun. 30, 2020, by the Japanese Patent Office as the International Searching Authority for International Application No. PCT/JP2020/013393.
(Continued)

*Primary Examiner* — Tan-Uyen T Ho
*Assistant Examiner* — Cherie M Poland
(74) *Attorney, Agent, or Firm* — BUCHANAN INGERSOLL & ROONEY PC

(57) ABSTRACT

A medical device includes: a drive shaft that is rotatable; a drive unit that is connected to a proximal portion of the drive shaft and rotates the drive shaft; a housing that accommodates the proximal portion of the drive shaft; and a handle portion that accommodates the drive unit and the housing, in which the housing includes an accommodation portion that is provided therein, a shaft support that is disposed in the accommodation portion and has a lumen through which the proximal portion of the drive shaft is inserted, and an elastic body that is disposed between an outer peripheral surface of the shaft support and an inner peripheral surface of the accommodation portion, and since an outer diameter of the shaft support is smaller than an inner diameter of the accommodation portion, the shaft support is movable in the accommodation portion.

22 Claims, 8 Drawing Sheets

(56) References Cited

U.S. PATENT DOCUMENTS

2001/0004700 A1     6/2001  Honeycutt et al.
2002/0058956 A1 *   5/2002  Honeycutt ..... A61B 17/320758
                                                      606/159
2015/0282833 A1 *  10/2015  Yoon .............. A61B 17/320725
                                                      606/114
2018/0055535 A1 *   3/2018  Tada ................. A61M 25/0023
2018/0317952 A1 *  11/2018  Jamous ............ A61M 25/0082

OTHER PUBLICATIONS

Office Action (Notice of Reasons for Refusal) issued Jun. 19, 2023, by the Japan Patent Office in corresponding Japanese Patent Application No. 2022-509888 and an English translation of the Office Action. (5 pages).

English Translations of the International Search Report (Form PCT/ISA/210) and the Written Opinion of the International Searching Authority (Form PCT/ISA/237) issued Jun. 30, 2020, by the Japan Patent Office in corresponding International Application No. PCT/JP2020/013393. (5 pages).

* cited by examiner

MEDICAL DEVICE

CROSS-REFERENCES TO RELATED APPLICATIONS

This application is a continuation of International Application No. PCT/JP2020/013393 filed on Mar. 25, 2020, the entire content of which is incorporated herein by reference.

TECHNOLOGICAL FIELD

This disclosure generally relates to a medical device for removing an object in a body lumen.

BACKGROUND DISCUSSION

Examples of a treatment method for a stenosed site caused by a plaque, a thrombus, and the like in a blood vessel include a method that involves dilating the blood vessel by using a balloon, and a method that involves causing a mesh-shaped or coil-shaped stent to indwell in the blood vessel as a support for the blood vessel. However, it is difficult for these methods to treat a stenosed site that is hardened by calcification or a stenosed site that is formed at a bifurcated portion in the blood vessel. An atherectomy device is known as a device that can perform treatment in such a case.

The atherectomy device is a device that removes the plaque in the blood vessel by shearing/breaking the plaque by a cutting portion that rotates at a high speed. The atherectomy device includes the cutting portion disposed at a distal end of a catheter, a drive shaft that transmits the high-speed rotation of the cutting portion from outside a body, and a tubular body that rotatably accommodates the drive shaft.

A proximal portion of the atherectomy device is provided with a handle portion that accommodates a drive unit driving a drive shaft. A shaft support for holding a proximal portion of the drive shaft and ensuring liquid-tightness is provided inside the handle portion. The shaft support is fitted into a housing portion of the handle portion. An example of this is disclosed in U.S. Pat. No. 8,475,484.

SUMMARY

Since the shaft support that holds the drive shaft is press-fitted into the housing portion of the handle portion, the shaft support cannot move with respect to the handle portion. A rotation axis of the drive shaft may swing due to, for example, bending during rotation. Therefore, friction is likely to occur between the drive shaft and the shaft support, which leads to a rotational torque loss of the drive shaft.

The medical device disclosed here is configured so that friction between a drive shaft and a shaft support is reduced.

The medical device includes: a drive shaft that is rotatable; a drive unit that is connected to a proximal portion of the drive shaft and rotates the drive shaft; a housing that accommodates the proximal portion of the drive shaft; and a handle portion that accommodates the drive unit and the housing. The housing includes an accommodation portion that is provided therein, a shaft support that is disposed in the accommodation portion and has a lumen through which the proximal portion of the drive shaft is inserted, and an elastic body that is disposed between an outer peripheral surface of the shaft support and an inner peripheral surface of the accommodation portion, and the outer diameter of the shaft support is smaller than an inner diameter of the accommodation portion, the shaft support is movable in the accommodation portion.

In the medical device configured as described above, when the drive shaft swings during rotation so that a central axis thereof tilts or moves in parallel, the shaft support can tilt or move with respect to the handle portion following the drive shaft. Therefore, friction between the drive shaft and the shaft support can be reduced, and a rotational torque loss of the drive shaft can be reduced.

According to another aspect, a medical device comprises: a rotatable drive shaft that possesses a distal portion and a proximal portion; a cutter that is fixed to the distal portion of the rotatable drive shaft to rotate together with the rotatable drive shaft and that is configured to cut an object located in a lumen or a cavity of a body; a motor connected to the proximal portion of the rotatable drive shaft and operable to rotate the rotatable drive shaft and the cutter to cut the object; and a shaft support having a lumen that extends through the shaft support, with the proximal portion of the rotatable drive shaft passing through the lumen in the shaft support. A housing includes an accommodation portion defining a space in which the shaft support is positioned. The rotatable drive shaft passes through the accommodation portion of the housing. A handle is grippable by a user, and the motor, the housing and the proximal portion of the rotatable drive shaft are positioned inside the handle. An elastic body is disposed between the outer peripheral surface of the shaft support and the inner peripheral surface of the accommodation portion, and the elastic body is in contact with the outer peripheral surface of the shaft support and the inner peripheral surface of the accommodation portion, while the outer peripheral surface of the shaft support and the inner peripheral surface of the accommodation portion are spaced from one another so that a gap exists between the outer peripheral surface of the shaft support and the inner peripheral surface of the accommodation portion to allow the shaft support to move in the accommodation portion in a manner causing a central axis of the rotatable drive shaft to shift in the accommodation portion.

According to another aspect, a medical device includes: a rotatable drive shaft that possesses a distal portion and a proximal portion; a cutter that is fixed to the distal portion of the rotatable drive shaft to rotate together with the rotatable drive shaft and that is configured to cut an object located in a lumen or a cavity of a body; a motor connected to the proximal portion of the rotatable drive shaft and operable to rotate the rotatable drive shaft and the cutter to cut the object; and a shaft support having a lumen that extends through the shaft support, with the proximal portion of the rotatable drive shaft passing through the lumen in the shaft support. A housing includes an accommodation portion in which is positioned the shaft support, with the rotatable drive shaft passing through the accommodation portion of the housing. The housing also includes a delivery port connectable to a liquid delivering tube to deliver liquid to the delivery port and a liquid delivery lumen in communication with the delivery port so that the liquid delivered to the delivery portion enters the liquid delivery lumen and flows in a distal direction within the housing. The liquid delivery lumen is positioned distal of the shaft support. The motor, the housing and the proximal portion of the drive shaft are positioned inside a handle that is grippable by a user. An elastic body is disposed between the outer peripheral surface of the shaft support and the inner peripheral surface of the accommodation portion, and the elastic body is in sealing contact with the outer peripheral surface of the shaft support and the inner peripheral surface of the accommodation portion. The elastic body is positioned proximal of the liquid delivery lumen and the delivery port so that the liquid entering the liquid delivery lumen by way of the delivery port is prevented from flowing proximally beyond the elastic body. The outer peripheral surface of the shaft support and the inner peripheral surface of the accommodation portion are spaced from one another so that a gap exists between the outer peripheral surface of the shaft support and the inner peripheral surface of the accommodation portion to allow the shaft support to move in the accommodation portion in a manner causing a central axis of the rotatable drive shaft to shift in the accommodation portion.

BRIEF DESCRIPTION OF THE DRAWINGS

FIGS. 7(a), 7(b) and 7(c) show schematic views of a state in which a lesion area is removed by the medical device, in which FIG. 7(a) shows a state in which cutting is started, FIG. 7(b) shows a state in which cutting is performed after an outer tube shaft is rotated, and FIG. 7(c) shows a state in which cutting is performed while the outer tube shaft is moved.

DETAILED DESCRIPTION

Set forth below with reference to the accompanying drawings is a detailed description of embodiments of a medical device for removing an object in a body lumen representing examples of the new medical device disclosed here. The dimensions or scales on the drawings may be exaggerated or different from actuality/reality for convenience of description and illustration. In addition, in the present specification, a side of a medical device to be inserted into a body lumen is referred to as a "distal side", and a side to be operated is referred to as a "proximal side".

A medical device 10 according to the present embodiment is inserted into a blood vessel in an acute lower limb ischemia or a deep vein thrombosis, and is used for a procedure for destroying (breaking-up) and removing a thrombus, a plaque, an atheroma, a calcified lesion, and the like. An object to be removed is not necessarily limited to the thrombus, the plaque, the atheroma, and the calcified lesion, and any object that may be present in a body lumen or a body-cavity may be applicable.

As shown in FIGS. 1 to 4, the medical device 10 includes a long or elongated drive shaft 20 that is rotationally driven, an outer tube shaft 22 that accommodates the drive shaft 20, a cutting portion (cutter) 24 that cuts a thrombus, a guide wire lumen tube 26 that is disposed inside the drive shaft 20, and a handle portion (handle) 28.

Figure 1:
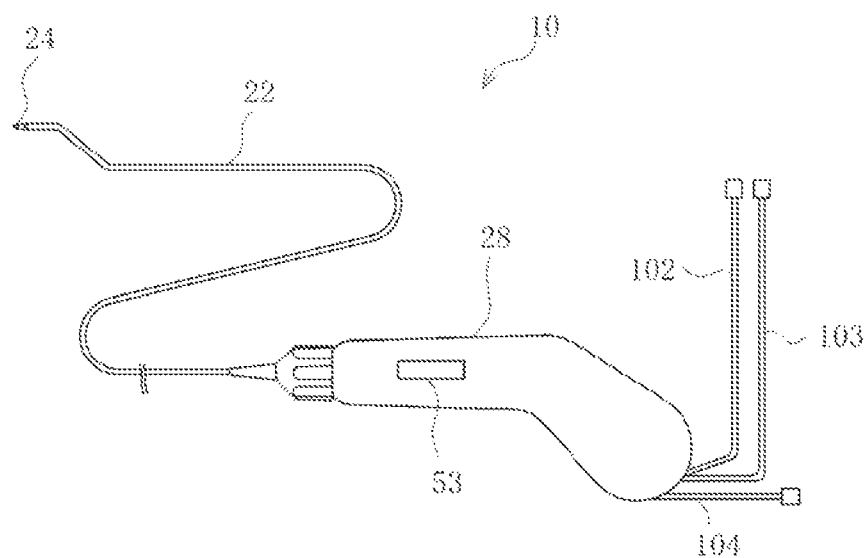
FIG. 1 is a plan view showing a medical device according to a first embodiment.
Figure 2:
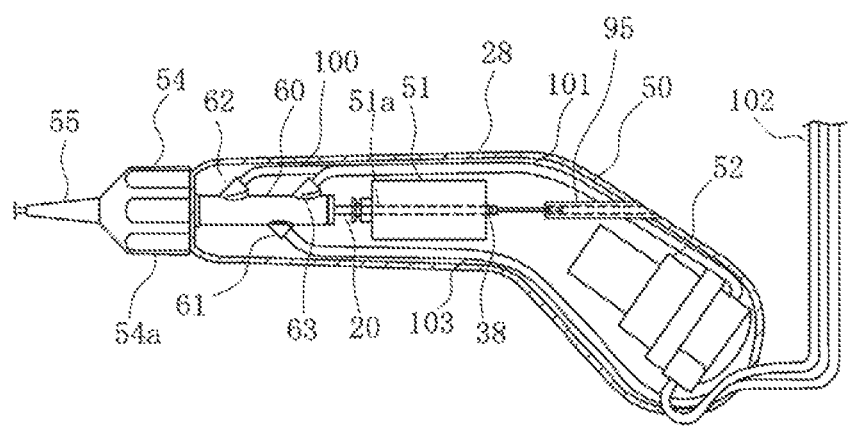
FIG. 2 is a diagram showing a casing of a handle of the medical device in a cross-sectional view, and other parts thereof in a plan view.
Figure 3:
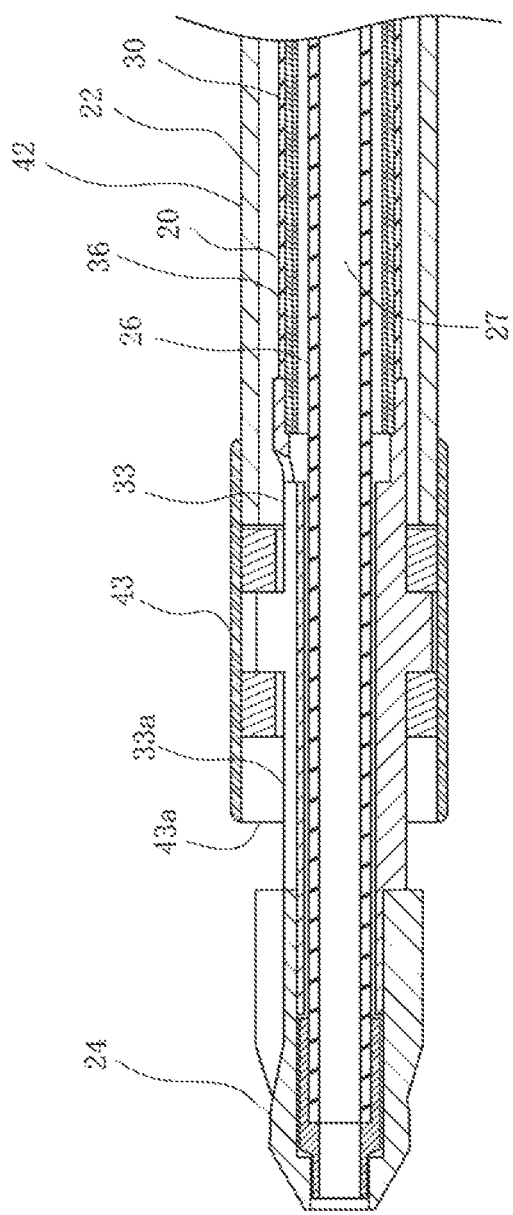
FIG. 3 is a cross-sectional view showing a distal portion of the medical device.
Figure 4:
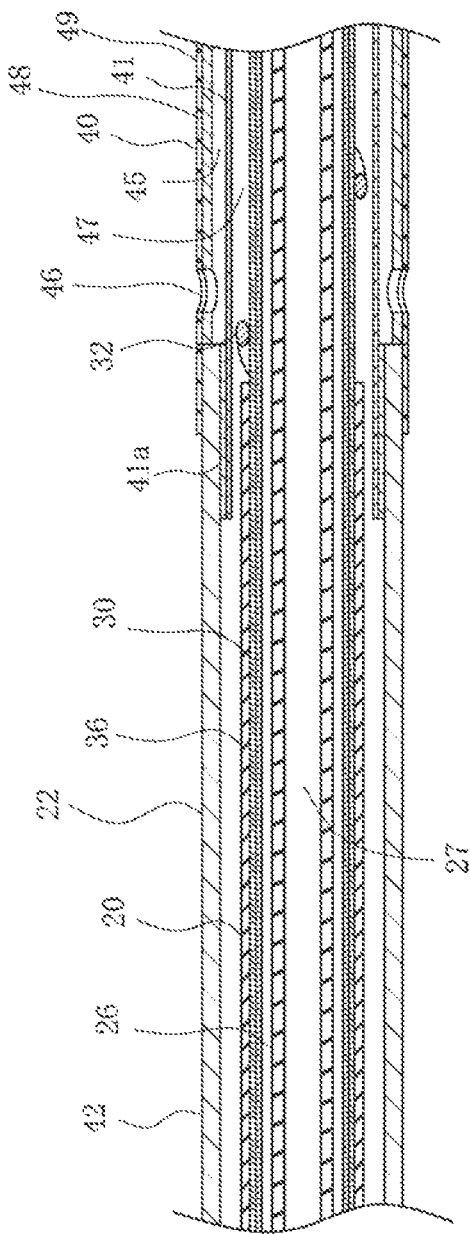
FIG. 4 is a cross-sectional view showing a portion at a predetermined distance from a distal end to a proximal side of the medical device.
Figure 5:
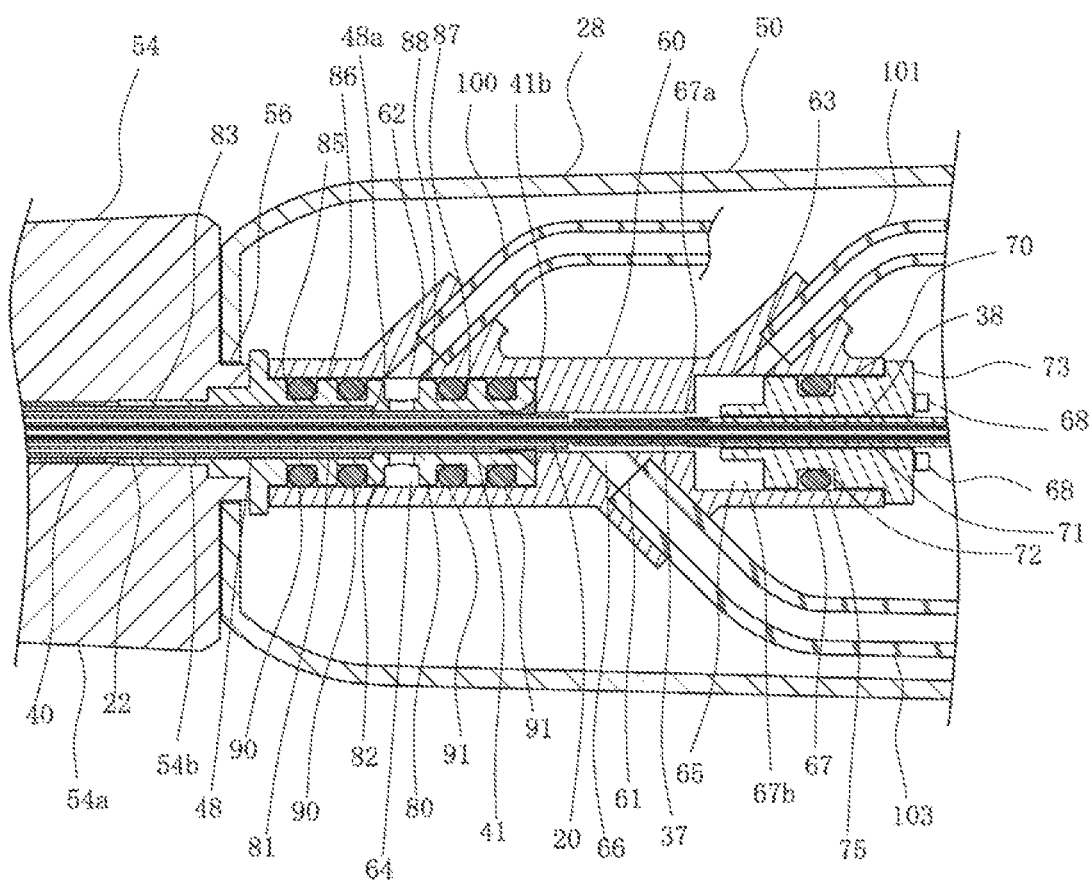
FIG. 5 is an enlarged cross-sectional view showing a part of the handle of the medical device.

As shown in FIGS. 2 to 4, the drive shaft 20 is a long (elongated) tubular body that transmits a rotational force to the cutting portion 24. The drive shaft 20 includes a coil member 30, a conveying coil 32 that generates a conveying force, and a rotating shaft portion 33 that is rotatably supported by a distal bearing portion 43, which will be described later, of the outer tube shaft 22. The drive shaft 20 further includes a first protective tube 36 disposed on an outer periphery of a distal portion of the drive shaft 20, a second protective tube 37 disposed on an outer periphery of a proximal portion of the drive shaft 20, and a proximal tube 38 disposed on an outer periphery of the drive shaft 20 on the proximal side with respect to the second protective tube 37.

Examples of a constituent material from which the coil member 30 may be fabricated include stainless steel, Ta, Ti, Pt, Au, W, polyolefins such as polyethylene and polypropylene, polyamides, polyesters such as polyethylene terephthalate, fluoropolymers such as an ethylene tetrafluoroethylene copolymer (ETFE), polyether ether ketone (PEEK), and polyimides.

The guide wire lumen tube 26 is a tubular body disposed inside the drive shaft 20. The guide wire lumen tube 26 has a guide wire lumen 27 through which a guide wire W passes. The guide wire lumen tube 26 prevents the guide wire W passing through the guide wire lumen 27 from rubbing against the drive shaft 20. A distal portion of the guide wire lumen tube 26 protrudes toward the distal side with respect to the drive shaft 20, and is disposed inside the cutting portion 24. That is, a distal portion of the guide wire lumen tube 26 is positioned inside the cutting portion 24 and a distal end portion of the guide wire lumen tube 26 extends distally beyond the distal end of the drive shaft 20. A proximal portion of the guide wire lumen tube 26 is interlocked with a hub proximal tube 95 disposed in the handle portion 28.

The outer tube shaft 22 is a long (elongated) tubular body that accommodates the drive shaft 20. The outer tube shaft 22 includes an outer layer 40, an inner layer 41, a shaping shaft 42, the distal bearing portion 43 disposed on the distal side with respect to the shaping shaft 42, and a seal holding portion 80 to which proximal portions of the inner layer 41 and the outer layer 40 are fixed. A liquid delivering lumen 45 for delivering a liquid such as physiological saline to the distal side is formed between the outer layer 40 and the inner layer 41. At least one liquid delivering opening portion 46 penetrating from an inner peripheral surface to an outer peripheral surface of is formed in a distal portion of the outer layer 40. A discharge lumen 47 for discharging the object such as a cut thrombus in a proximal direction is formed inside the inner layer 41.

The outer layer 40 includes a torque shaft 48 and an outer sheath 49 that is in close contact with an outer peripheral surface of the torque shaft 48.

The torque shaft 48 is a tubular body that transmits a torque applied by an operator on the handle portion 28 to the distal side. A proximal portion of the torque shaft 48 is fixed to an inner peripheral surface of the seal holding portion 80. A distal portion of the torque shaft 48 is fixed to a proximal portion of the shaping shaft 42. The aforementioned liquid delivering lumen 45 is formed inside the torque shaft 48. It is preferable that the torque shaft 48 has flexibility so as to be bent in the body lumen and has high torque transmission performance. Examples of a constituent material from which the torque shaft 48 may be fabricated include a circular tube made of a metal material having a certain degree of strength, in which spiral slits or grooves are formed by laser processing. Examples of the metal material that may be used include stainless steel, Ta, Ti, Pt, Au, or W.

The outer sheath 49 is a tubular body that is in close contact with the outer peripheral surface of the torque shaft 48. The outer sheath 49 prevents leakage of the liquid in the liquid delivering lumen 45 from between gaps of the spiral slits formed in the torque shaft 48. The outer sheath 49 is formed of, for example, a heat-shrinkable tube whose diameter is reduced by heating and which is brought into close contact with the torque shaft 48.

The inner layer 41 is disposed inside the outer layer 40 with a gap therebetween. The gap between the inner layer 41 and the outer layer 40 is the liquid delivering lumen 45. The discharge lumen 47 for discharging the object such as a cut thrombus in the proximal direction is formed inside the inner layer 41. The inner layer 41 is, for example, a tubular body in which a braided wire braided in a tubular shape is embedded in a resin material as a reinforcement body. A distal portion of the inner layer 41 is fixed to an inner peripheral surface of the shaping shaft 42 with a first sealing portion 41*a* which is an adhesive or the like. The proximal portion of the inner layer 41 protrudes toward the proximal side with respect to the outer layer 40 (i.e., the proximal end portion of the inner layer 41 protrudes proximally beyond the proximal end of the outer layer 40), and is fixed to the inner peripheral surface of the seal holding portion 80 with a second sealing portion 41*b* which is an adhesive or the like.

The resin material forming the inner layer 41 preferably has a certain degree of flexibility and low friction, and polyether ether ketone (PEEK), fluoropolymers such as PTFE and ETFE, polymethyl methacrylate (PMMA), polyethylene (PE), a polyether block amide copolymer (PEBAX), polyimides, or a combination thereof can be preferably used.

The shaping shaft 42 is a tubular body to which the distal portion of the torque shaft 48 is fixed. The shaping shaft 42 is bent at two positions such that an axis of the proximal portion and an axis of a distal portion of the shaping shaft 42 are shifted from each other. The number of bent portions of the shaping shaft 42 may be one or three or more. The shaping shaft 42 can be used for changing positions and orientations of a distal portion of the outer tube shaft 22 and the cutting portion 24 by rotation.

The distal bearing portion 43 is disposed at the most distal end of the outer tube shaft 22, and rotatably supports the rotating shaft portion 33 provided on the drive shaft 20. The distal bearing portion 43 is fixed to the distal portion of the shaping shaft 42. On the distal side of the distal bearing portion 43, a distal opening portion 43*a* is formed which aspirates the object such as a cut thrombus or the liquid discharged from the liquid delivering opening portion 46 and allows the object and the liquid to enter into the discharge lumen 47. A distal end of the distal bearing portion 43 is located on the proximal side of the cutting portion 24.

The proximal portion of the outer layer 40 and the proximal portion of the inner layer 41 are fixed to the seal holding portion 80, and at least a part of the seal holding portion 80 is disposed inside a housing 60 provided in the handle portion 28. The seal holding portion 80 holds a plurality of seals and is rotatably supported inside the housing 60. The seal holding portion 80 includes a holding portion lumen 81 penetrating along an axis of the drive shaft 20, a supply port 82 penetrating from an outer peripheral surface thereof to the holding portion lumen 81, and an operation fixing portion 83 fixed to an operation portion 54 to be described later. The seal holding portion 80 further includes two first recesses 85 formed on the outer peripheral surface thereof on the distal side with respect to the supply port 82, three first stoppers 86 arranged alternately with the first recesses 85, two second recesses 87 formed on the outer peripheral surface thereof on the proximal side with respect to the supply port 82, and three second stoppers 88 alternately arranged with the second recesses 87.

At least a part of the outer tube shaft 22, the drive shaft 20, and the guide wire lumen tube 26 pass through the holding portion lumen 81. The torque shaft 48 of the outer layer 40 is fixed to the distal side of the holding portion lumen 81 with respect to the supply port 82 with an adhesive or the like. The inner layer 41 protruding inside the torque shaft 48 from a proximal opening portion 48*a* of the torque shaft 48 in the proximal direction is fixed to the proximal side of the holding portion lumen 81 with respect to the supply port 82 with the second sealing portion 41*b*. Therefore, the liquid delivering lumen 45 between the outer layer 40 and the inner layer 41 communicates with the supply port 82.

Each of the first recesses 85 accommodates a first elastic body 90 such as an O-ring. The first elastic bodies 90 maintain liquid-tightness between the seal holding portion 80 and the housing 60 while maintaining a state in which the seal holding portion 80 is rotatable inside the housing 60. The first stoppers 86 prevent the first elastic bodies 90 from falling off the first recesses 85. Each of the second recesses 87 accommodates a second elastic body 91 such as an O-ring. The second elastic bodies 91 maintain the liquid-tightness between the seal holding portion 80 and the housing 60 while maintaining the state in which the seal holding portion 80 is rotatable inside the housing 60. The second stoppers 88 prevent the second elastic bodies 91 from falling off the second recesses 87.

An anti-kink protector 55 and the operation portion 54 are fixed to an outer peripheral surface of a proximal portion of the outer tube shaft 22. The anti-kink protector 55 prevents kinking at the proximal portion of the outer tube shaft 22. An outer surface of the operation portion 54 may be formed with irregularities so as to be easily caught or grasped (held) by fingers of the operator.

Examples of constituent materials from which the torque shaft 48 and the shaping shaft 42 may be fabricated preferably have a certain degree of strength, and may be stainless steel, Ta, Ti, Pt, Au, W, and a shape memory alloy. Examples of a constituent material from which the outer tube shaft 22 may be fabricated include a resin, for example, an engineering plastic such as an ABS resin, polycarbonate (PC), polymethyl methacrylate (PMMA), polyacetal (POM), polyphenyl sulfone (PPSU), polyethylene (PE), a carbon fiber, or polyether ether ketone (PEEK).

The cutting portion 24 is a member that is configured to cut the object such as a thrombus. The cutting portion 24 is fixed to an outer peripheral surface of the distal portion of the drive shaft 20. The cutting portion 24 has a large number of minute abrasive grains on its outer surface. Alternatively, the cutting portion 24 may include a sharp blade.

The rotating shaft portion 33 is rotatably supported by the distal bearing portion 43 provided on the outer tube shaft 22. A proximal portion of the rotating shaft portion 33 is fixed to the coil member 30, and a distal portion of the rotating shaft portion 33 is fixed to the cutting portion 24. The rotating shaft portion 33 has at least one groove-shaped passage 33a extending along the axis (i.e., along the longitudinal axis or axial extent pf the rotating shaft portion 33). The passage 33a allows the object(s) cut by the cutting portion 24 to pass through an inside of (i.e., radially inwardly of) the distal bearing portion 43 in the proximal direction.

A constituent material for the cutting portion 24 preferably has sufficient strength to cut a thrombus, and examples of such material include stainless steel, Ta, Ti, Pt, Au, W, a shape memory alloy, and a cemented carbide.

The handle portion 28 includes a casing 50, a drive unit 51, a liquid delivering unit 52, a switch 53, a suction tube 102, a first liquid delivering tube 100, a second liquid delivering tube 101, a discharge tube 103, and an electric cable 104. The handle portion 28 further includes the operation portion 54, the housing 60, and a shaft support 70.

The casing 50 forms an outline of the handle portion 28. The casing 50 accommodates the drive unit 51, the housing 60, the shaft support 70, the first liquid delivering tube 100, the second liquid delivering tube 101, a part of the discharge tube 103, and a part of the electric cable 104. A passage hole 56 through which the drive shaft 20, the outer tube shaft 22, and the guide wire lumen tube 26 pass is formed in a distal portion of the casing 50.

The drive unit 51 is, for example, a hollow motor. The drive unit 51 includes a hollow power shaft 51a that generates a driving force by electric power supplied from outside via the electric cable 104. The power shaft 51a passes through the drive unit 51 and rotates while being supported by a bearing. The power shaft 51a accommodates the drive shaft 20 therein. An inner peripheral surface of the power shaft 51a is in slidable contact with an outer peripheral surface of the drive shaft 20. The drive shaft 20 substantially penetrates the power shaft 51a, and the proximal portion of the drive shaft 20 is fixed to a proximal portion of the power shaft 51a by welding, adhesion, or the like. A rotation speed of the power shaft 51a is not particularly limited, and may be, for example, 5,000 rpm to 200,000 rpm. The drive unit 51 is connected to a control apparatus, and can be controlled from an inside or an outside of the handle portion 28.

The electric cable 104 can be connected to an external power supply or the control apparatus. The switch 53 is a portion operated by the operator to drive and stop the drive unit 51. The switch 53 is located on an outer surface of the casing 50. When a battery is provided in the handle portion 28, an electric cable is located in the handle portion 28 and connected to the battery. When the electric cable 104 is connected to the external power supply, the control apparatus can be provided in the handle portion 28 to perform signal processing on an operation input of the switch 53 and control the drive unit 51 and the liquid delivering unit 52.

The operation portion 54 is a portion that is operated by the operator with the fingers to apply a rotational torque to the outer tube shaft 22. The operation portion 54 is fixed to the operation fixing portion 83 of the seal holding portion 80 to which the outer tube shaft 22 is fixed. The operation portion 54 includes an operation dial 54a and a fixing recess 54b. The operation dial 54a is a substantially disk-shaped portion operated by the operator with the fingers. An outer peripheral surface of the operation dial 54a has high frictional resistance so as to be easily operated. The operation fixing portion 83 of the seal holding portion 80 is fitted into and fixed to the fixing recess 54b. When the operator rotates the operation portion 54, the outer tube shaft 22 fixed to the operation portion 54 rotates with respect to the drive shaft 20, the guide wire lumen tube 26, and the casing 50. At this time, the first elastic bodies 90 and the second elastic bodies 91 held by the seal holding portion 80 to which the operation portion 54 is fixed slide on the outer peripheral surface of the seal holding portion 80 while receiving frictional resistance. The frictional resistance of the first elastic bodies 90 and the second elastic bodies 91 with respect to the seal holding portion 80 is large enough to hold an orientation of a rotation direction of the outer tube shaft 22. Therefore, when the operator releases the fingers after rotating the operation dial 54a, a rotated position is held by the frictional resistance of the first elastic bodies 90 and the second elastic bodies 91 with respect to the seal holding portion 80. The first elastic bodies 90 and the second elastic bodies 91 may be held on the outer peripheral surface of the seal holding portion 80 and slide on an inner peripheral surface of the housing 60.

The housing 60 includes a discharge port 61 through which the liquid or the object is discharged, and a first liquid delivering port 62 and a second liquid delivering port 63 through which the liquid is delivered. The housing 60 further includes a first liquid delivering lumen 64 with which the first liquid delivering port 62 communicates, a second liquid delivering lumen 65 with which the second liquid delivering port 63 communicates, and a discharge lumen 66 with which the discharge port 61 communicates.

The first liquid delivering lumen 64 has a predetermined inner diameter and is disposed in a distal portion of the housing 60. The first liquid delivering lumen 64 rotatably accommodates the seal holding portion 80. The first elastic bodies 90 and the second elastic bodies 91 held by the seal holding portion 80 are in slidable contact with an inner peripheral surface of the first liquid delivering lumen 64. The first liquid delivering port 62 is formed at a position communicating with the supply port 82 of the seal holding portion 80. The first liquid delivering port 62 is located on the proximal side with respect to the first elastic bodies 90, and is located on the distal side with respect to the second elastic bodies 91. The first liquid delivering port 62 is connected to the first liquid delivering tube 100 and can receive the liquid from the first liquid delivering tube 100. The liquid delivered from the first liquid delivering port 62 can flow from the supply port 82 into the liquid delivering lumen 45 formed between the torque shaft 48 and the inner layer 41. At this time, the first elastic bodies 90 prevent the liquid in the first liquid delivering lumen 64 from leaking to an outside of the housing 60. In addition, the second elastic bodies 91 prevent the liquid in the first liquid delivering lumen 62 from leaking to the discharge lumen 66. In addition, the second sealing portion 41b that fixes the inner layer 41 and the seal holding portion 80 prevents the liquid flowing into the liquid delivering lumen 45 from leaking to the discharge lumen 66. The first elastic bodies 90 and the second elastic bodies 91 may be held by a groove portion formed on the inner peripheral surface of the first liquid delivering lumen 64 instead of the seal holding portion 80.

The second liquid delivering lumen 65 has a predetermined inner diameter and is disposed in a proximal portion of the housing 60. The housing 60 includes an accommodation portion 67 that accommodates the shaft support 70 that seals the second liquid delivering lumen 65. The accommodation portion 67 includes a first accommodation portion 67a that accommodates the proximal portion of the drive shaft 20, and a second accommodation portion 67b that has an inner diameter larger than that of the first accommodation portion 67a and accommodates the shaft support 70. A third elastic body 75 held by the shaft support 70 is in contact with an inner peripheral surface of the second liquid delivering lumen 65. A position of the second liquid delivering lumen 65 which is in contact with the third elastic body 75 is on the proximal side with respect to the second liquid delivering port 63. That is, the position at which the third elastic body 75 contacts the inner surface of the second accommodation portion 67b is proximal of the second liquid delivering port 63. A distal side of the second liquid delivering lumen 65 communicates with the discharge lumen 66. The second liquid delivering port 63 is connected to the second liquid delivering tube 101 and can receive the liquid from the second liquid delivering tube 101. The liquid delivered from the second liquid delivering port 63 can flow into the discharge lumen 66 communicating with the second liquid delivering lumen 65. At this time, the third elastic body 75 prevents the liquid in the second liquid delivering lumen 65 from leaking to the outside of the housing 60.

The discharge lumen 66 is disposed between the first liquid delivering lumen 64 and the second liquid delivering lumen 65. The discharge lumen 66 communicates with the second liquid delivering lumen 65. An inner diameter of the discharge lumen 66 is smaller than the inner diameter of the first liquid delivering lumen 64 and the inner diameter of the second liquid delivering lumen 65. The discharge port 61 is connected to the discharge tube 103. A proximal end of the outer tube shaft 22 is open in the discharge lumen 66. The drive shaft 20 protruding from the proximal end of the outer tube shaft 22 in the proximal direction passes through the discharge lumen 66 and further extends in the proximal direction. Therefore, the discharge lumen 47 formed between the outer tube shaft 22 and the drive shaft 20 communicates with the discharge lumen 66. The discharge lumen 66 can receive the liquid or the object from the discharge lumen 47, and the liquid or the object can be discharged from the discharge port 61 to the discharge tube 103.

The shaft support 70 is a member that is inserted into or positioned in the second accommodation portion 67b of the accommodation portion 67 from a proximal side of the housing 60, holds a portion of the drive shaft 20 on the distal side with respect to the drive unit 51, that is, the proximal portion of the drive shaft 20, and partially closes the second liquid delivering lumen 65. The shaft support 70 includes a support lumen 71 penetrating or extending along the axis (central axis or longitudinal axis) of the drive shaft 20, a third recess 72 formed in an outer peripheral surface thereof, and a lid portion 73 having an outer diameter larger than the inner diameter of the second accommodation portion 67b and facing a proximal surface of the housing 60. The drive shaft 20 and the guide wire lumen tube 26 pass through the support lumen 71.

The third recess 72 accommodates the third elastic body 75 such as an O-ring. The third elastic body 75 is in contact with the outer peripheral surface of the shaft support 70 and an inner peripheral surface of the second accommodation portion 67b, and maintains liquid-tightness between the shaft support 70 and the second liquid delivering lumen 65. The third recess 72 has a width larger than that of the third elastic body 75.

A distal surface of the lid portion 73 faces a proximal surface (proximal end surface) of the second accommodation portion 67b. A proximal surface of the lid portion 73 faces stopper portions 68 protruding from the housing 60. Movement of the shaft support 70 in an axial direction is restricted by the stopper portions 68, and detachment of the shaft support 70 from the housing 60 is prevented.

Figure 6:
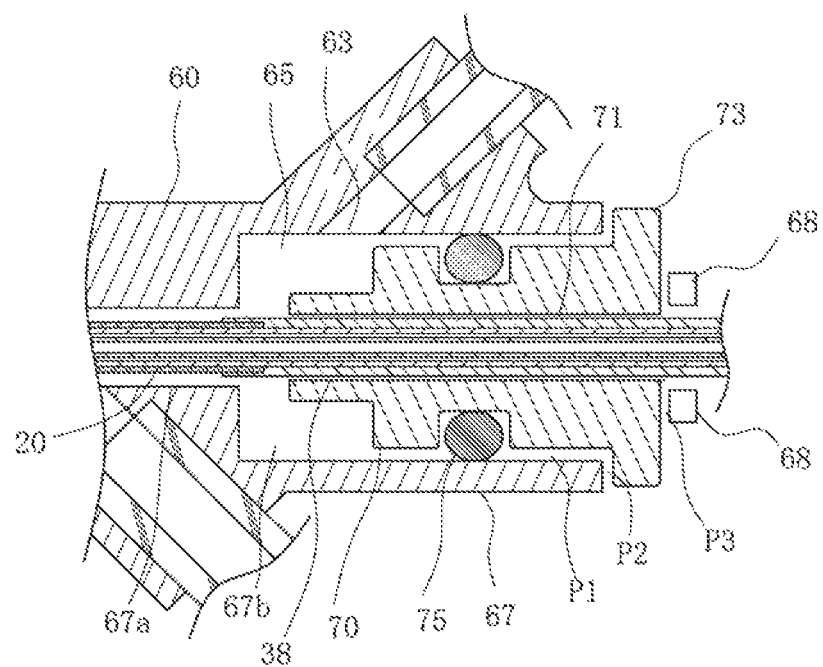
FIG. 6 is an enlarged view of the vicinity of a shaft support in FIG. 5.

As shown in FIG. 6, a gap P1 is provided between the shaft support 70 and the housing 60. An outer diameter of the shaft support 70 is smaller than the inner diameter of the second accommodation portion 67b. Therefore, the gap P1 is formed between the outer peripheral surface of the shaft support 70 and the inner peripheral surface of the second accommodation portion 67b of the housing 60. FIG. 6 shows gaps in an exaggerated manner. The gap P1 is in a range of 25 µm to 125 µm. However, a size of the gap P1 may be in a range other than this.

A gap P2 is provided between the lid portion 73 of the shaft support 70 and the proximal surface of the second accommodation portion 67b facing the lid portion 73. In addition, a gap P3 is provided between the proximal surface of the lid portion 73 and the stopper portions 68. The gaps P1, P2, and P3 can cause the shaft support 70 to turn with respect to the housing 60 so as to tilt the axial direction. In addition, the gap P1 can cause the shaft support 70 to move in parallel with respect to the housing 60 while maintaining the axial direction thereof constant. That is, the shaft support 70 is movable in the accommodation portion 67.

Examples of constituent materials for the first elastic bodies 90, the second elastic bodies 91, and the third elastic body 75 include silicone rubber, ethylene propylene rubber, nitrile rubber, chloroprene rubber, isoprene rubber, butyl rubber, styrene butadiene rubber, natural rubber such as polyurethane, synthetic rubber, and a silicone resin. As the constituent materials for the first elastic bodies 90, the second elastic bodies 91, and the third elastic body 75, a resin material such as PTFE, FEP, or nylon may be used. As shown in FIG. 6, cross-sectional shapes of the first elastic bodies 90, the second elastic bodies 91, and the third elastic body 75 are not limited to a circular or elliptical shape, and may be a rectangular shape.

Examples of constituent materials for the housing 60, the seal holding portion 80, the lid portion 73, and the operation portion 54 include ultra high molecular weight polyethylene, polyester, polyamides, fluorine-based resins such as polytetrafluoroethylene, an ABS resin, polyacetal (POM), polycarbonate (PC), polypropylene (PP), polybutylene terephthalate (PBT), polymethyl methacrylate (PMMA), and a combination of two or more thereof (polymer alloys, polymer blends, laminates, or the like).

The liquid delivering unit 52 is a pump that delivers the liquid to the housing 60 via the first liquid delivering tube 100 and the second liquid delivering tube 101. The liquid delivering unit 52 is connected to the suction tube 102 that receives a supply of the liquid such as physiological saline from a liquid delivering source outside the casing 60, and can suction the liquid from the suction tube 102. The liquid delivering unit 52 is connected to the first liquid delivering tube 100 and the second liquid delivering tube 101, and can discharge the suctioned liquid to the first liquid delivering tube 100 and the second liquid delivering tube 101. The external liquid delivering source is, for example, a physiological saline bag, but is not limited thereto. The liquid delivering unit 52 may be provided outside the handle portion 28 instead of being provided in the handle portion 28. The liquid delivering unit 52 is not limited to a pump as long as a liquid delivering pressure can be generated, and may be, for example, a syringe, a bag suspended from a drip tower, or a pressurized bag.

The discharge tube 103 is a tube that discharges the liquid or the object to the outside of the casing 50. The discharge tube 103 is connected to, for example, a waste liquid bag capable of accommodating the liquid or the object. The discharge tube 103 may be connected to an aspiration source that can perform active aspiration, such as a pump or a syringe.

The proximal portion of the drive shaft 20 is connected to the power shaft 51a via a proximal shaft 38 provided on an outer peripheral side of the drive shaft 20. The drive shaft 20 is welded or bonded at a proximal portion of the proximal shaft 38, and the proximal shaft 38 is bonded or welded to the power shaft 51a, whereby the drive shaft 20 is fixed. When the shaft support 70 and the drive shaft 20 are directly connected to each other, a large amount of leakage occurs due to the rotation of the drive shaft 20 formed with the coil member 30, but the leakage can be reduced by interposing the proximal shaft 38 between the shaft support 70 and the drive shaft 20.

Next, a method of using the medical device 10 according to the present embodiment will be described. Here, a case where a calcified lesion area in a blood vessel is destroyed (e.g., broken-up) and aspirated will be described as an example.

Figure 7A:
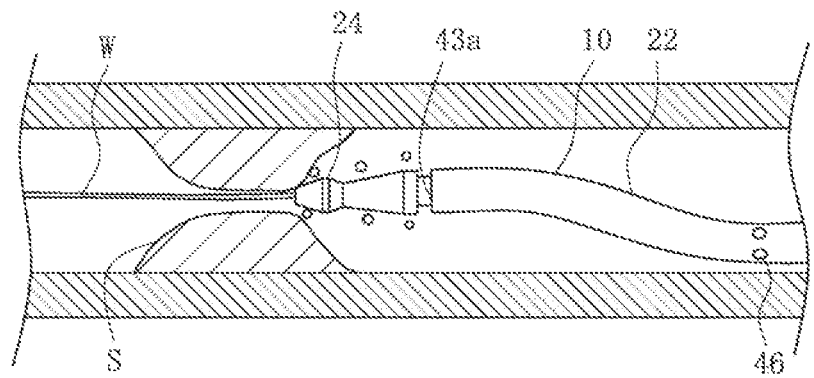

First, the operator inserts the guide wire W into the blood vessel and causes the guide wire W to reach the vicinity of a lesion area S. Next, the operator inserts a proximal end of the guide wire W into the guide wire lumen 27 of the medical device 10. Thereafter, as shown in FIG. 7(a), the cutting portion 24 of the medical device 10 is moved to the vicinity of the lesion area S using the guide wire W as a guide.

Next, the operator operates the switch 53 to start operations of the drive unit 51 and the liquid delivering unit 52. Accordingly, the power shaft 51a of the drive unit 51 rotates, and the drive shaft 20 fixed to the power shaft 51a and the cutting portion 24 fixed to the drive shaft 20 rotate. Accordingly, the operator can cut the lesion area S by the cutting portion 24. When the power shaft 51a rotates, the conveying coil 32 disposed on the outer peripheral surface of the drive shaft 20 generates a force for conveying the liquid or the object in the discharge lumen 47 to the proximal side and in the proximal direction. An aspiration force is applied to the distal opening portion 43a of the outer tube shaft 22.

Figure 7B:
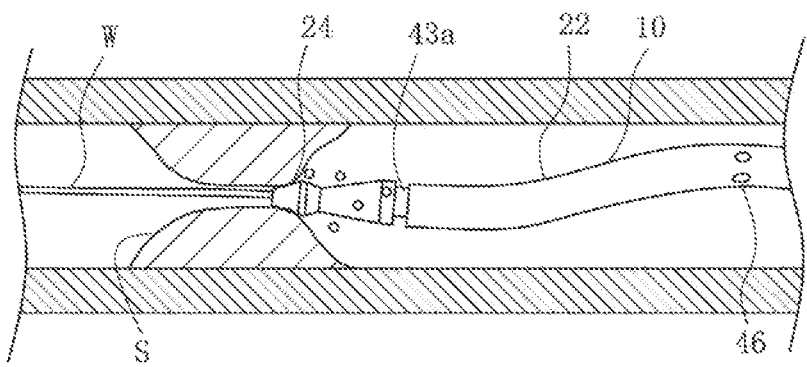
Figure 7C:
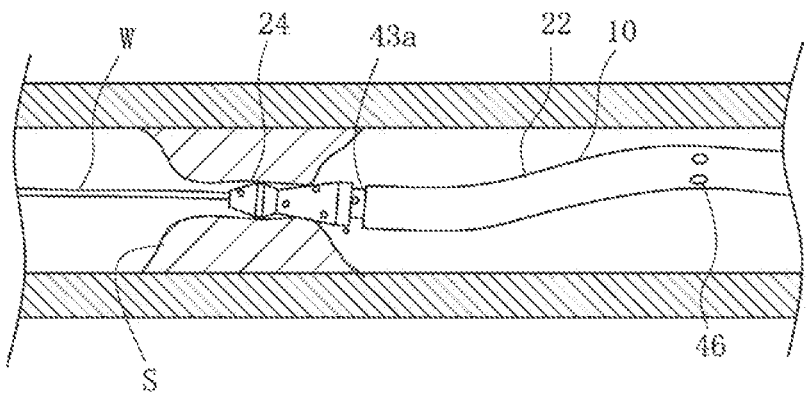

When the operator wants to change a position of the cutting portion 24 in a circumferential direction, the operator can operate the operation portion 54. When the operator rotates the operation dial 54a, the outer tube shaft 22 fixed to the operation portion 54 rotates. The seal holding portion 80 of the outer tube shaft 22 to which the operation portion 54 is fixed rotates inside the first liquid delivering lumen 64 of the housing 60. At this time, the seal holding portion 80 slides on inner peripheral surfaces of the first elastic bodies 90 and the second elastic bodies 91. When the outer tube shaft 22 rotates, a direction of the distal portion of the shaping shaft 42 provided at the distal portion of the outer tube shaft 22 changes, and the position of the cutting portion 24 can be changed as shown in FIG. 7(b). Therefore, cutting can be performed while changing the direction of the cutting portion 24 without rotating the entire handle portion 28 that is difficult to rotate greatly. Further, the operator moves the entire handle portion 28 or the outer tube shaft 22 exposed to the outside of the body in the axial direction to reciprocate the outer tube shaft 22 along a longitudinal direction of the blood vessel. Accordingly, as shown in FIG. 7(c), the lesion area S can be cut along the longitudinal direction of the blood vessel by the cutting portion 24.

Figure 8:
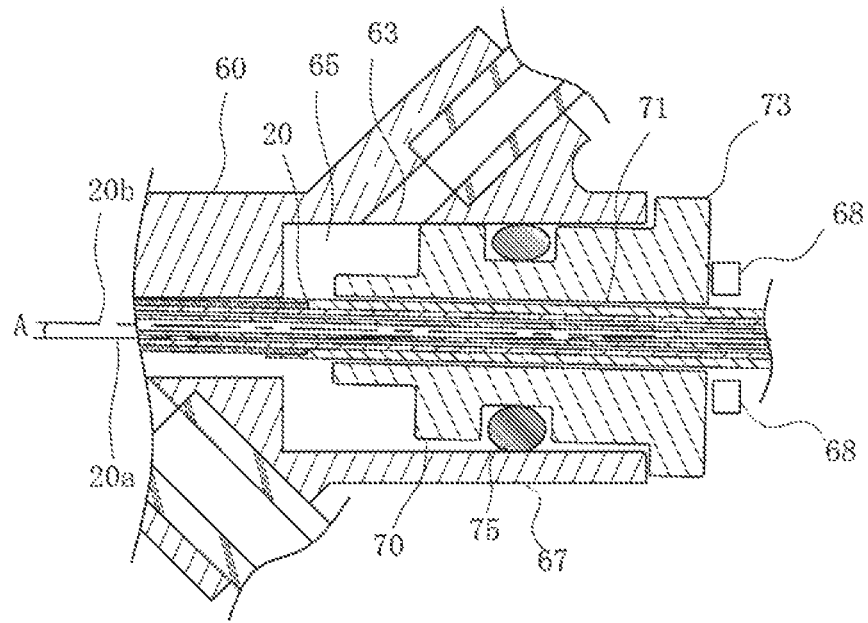
FIG. 8 is an enlarged cross-sectional view of the vicinity of the shaft support when a central axis of the drive shaft swings so as to tilt.

When the lesion area S is cut by the cutting portion 24, a central axis of the drive shaft 20 may swing or tilt. As shown in FIG. 8, a case where a central axis 20b of the drive shaft 20 swings so as to be tilted by an angle A from an original central axis 20a will be described as an example. In this case, the shaft support 70 can tilt with respect to the housing 60 in accordance with the tilt of the drive shaft 20. This is because gaps are provided between the outer peripheral surface of the shaft support 70 and the inner peripheral surface of the second accommodation portion 67b of the accommodation portion 67, between the lid portion 73 of the shaft support 70 and the proximal surface of the second accommodation portion 67b of the accommodation portion 67, and between a proximal surface (proximal end surface) of the shaft support 70 and the stopper portions 68, respectively. Since the shaft support 70 is supported on the housing 60 by the third elastic body 75, the shaft support 70 can turn around the third elastic body 75 with respect to the housing 60. In this way, by tilting the shaft support 70 following the tilt of the drive shaft 20, friction between the drive shaft 20 and the shaft support 70 can be reduced, and a rotational torque loss of the drive shaft 20 can be reduced.

Figure 9:
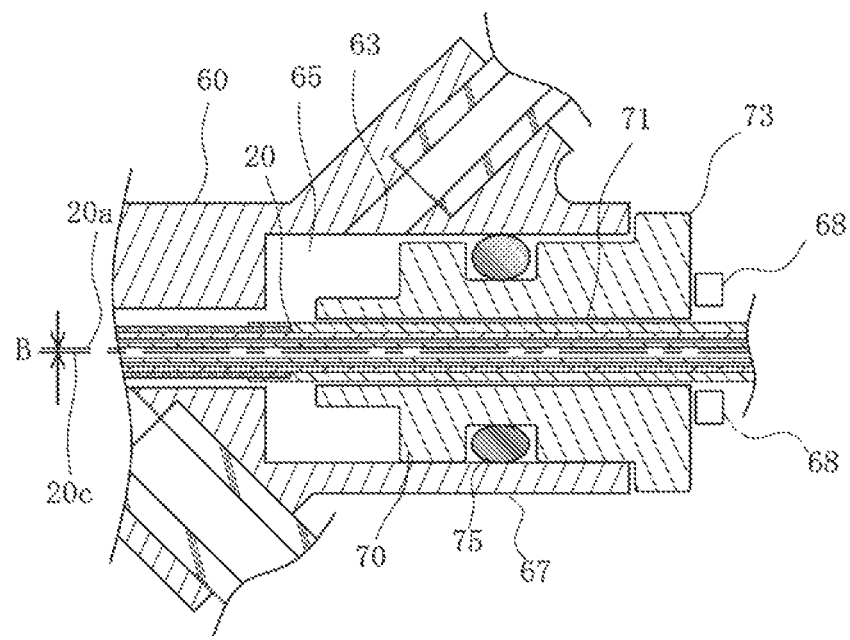
FIG. 9 is an enlarged cross-sectional view of the vicinity of the shaft support when the central axis of the drive shaft swings so as to move in parallel.

The central axis of the drive shaft 20 may swing or shift so as to move in parallel from the original central axis 20a. As shown in FIG. 9, when a central axis 20c moves in parallel by a distance B from the original central axis 20a (i.e. the central axis 20c is not coaxial with the original central axis 20a), the shaft support 70 can move in parallel with respect to the housing 60 in accordance with the movement of the drive shaft 20. Accordingly, the rotational torque loss of the drive shaft 20 can be reduced.

Since the third recess 72 has a width larger than that of the third elastic body 75, the shaft support 70 supported on the housing 60 by the third elastic body 75 is easily turned with respect to the housing 60. Therefore, the shaft support 70 can easily follow the swing of the drive shaft 20.

When the operation of the liquid delivering unit 52 is started, physiological saline is suctioned into the liquid delivering unit 52 from the suction tube 102 and discharged to the first liquid delivering tube 100 and the second liquid delivering tube 101. The physiological saline discharged to the first liquid delivering tube 100 flows into the first liquid delivering lumen 64 of the housing 60 from the first liquid delivering port 62. The physiological saline that flows into the first liquid delivering lumen 64 from the first liquid delivering port 62 flows into the liquid delivering lumen 45 formed between the outer layer 40 and the inner layer 41 from the supply port 82 of the seal holding portion 80. At this time, the first elastic bodies 90 prevent the liquid in the first liquid delivering lumen 64 from leaking to the outside of the housing 60. In addition, the second elastic bodies 91 prevent the liquid in the second liquid delivering lumen 65 from leaking to the discharge lumen 66. In addition, the second sealing portion 41b that fixes the inner layer 41 and the seal holding portion 80 prevents the liquid flowing into the liquid delivering lumen 45 from leaking to the discharge lumen 66. Therefore, the physiological saline that flows into the first liquid delivering lumen 64 from the first liquid delivering port 62 is effectively guided to the liquid delivering lumen 45 while maintaining a high liquid delivering pressure.

The physiological saline discharged to the second liquid delivering tube 101 flows into the second liquid delivering lumen 65 of the housing 60 from the second liquid delivering port 63. The third elastic body 75 prevents the liquid in the second liquid delivering lumen 65 from leaking to the outside of the housing 60. In addition, the physiological saline supplied from the second liquid delivering tube 101 to the second liquid delivering lumen 65 flows into the discharge lumen 66 on the distal side.

The physiological saline that entered the liquid delivering lumen 45 moves in a distal direction. The physiological saline that moved in the liquid delivering lumen 45 in the distal direction is discharged into the blood vessel from the liquid delivering opening portion 46 formed in the distal portion of the outer layer 40. A part of the physiological saline discharged into the blood vessel is, together with blood and the cut object, aspirated into the discharge lumen 47 from the distal opening portion 43a of the outer tube shaft 22. The object and the liquid that enter the discharge lumen 47 move in the discharge lumen 47 toward the proximal direction. The object and the blood to be aspirated into the discharge lumen 47 are diluted with the physiological saline. Therefore, a discharge amount is increased by decreasing the viscosity of the discharged material, and formation of a thrombus in the discharge lumen 47 is prevented. Therefore, aspiration performance can be improved while preventing a decrease of the aspiration force or a damage of the medical device 10 due to the formation of the thrombus in the discharge lumen 47. In addition, the thrombus formed in the medical device 10 is prevented from flowing into the body lumen. By mixing an anticoagulant such as heparin into a physiological salt solution in advance, an effect of preventing the thrombus formation can be improved.

When the liquid or the object that enters the discharge lumen 47 moves in the discharge lumen 47 toward the proximal direction, the liquid or the object reaches the discharge lumen 66 of the housing 60 from the proximal opening portion 48a on the inner layer 41. When the liquid or the object reaches the discharge lumen 66, the liquid or the object is discharged from the discharge port 61 to the external waste liquid bag via the discharge tube 103.

The physiological saline flows into the discharge lumen 66 from the second liquid delivering lumen 65 on the proximal side. Accordingly, the liquid or the object flowing from the discharge lumen 47 into the discharge lumen 66 is diluted by the physiological saline. Therefore, the discharge amount is increased by decreasing the viscosity of the discharged material, and the formation of thrombi in the discharge lumen 47, the discharge lumen 66, and the discharge tube 103 is prevented. Therefore, the aspiration performance is improved while preventing the decrease of the aspiration force or the damage of the medical device 10 due to the formation of the thrombi in the discharge lumen 47, the discharge lumen 66, and the discharge tube 103. Even in this case, by mixing the anticoagulant such as heparin into the physiological salt solution in advance, the effect of preventing the thrombus formation can be improved.

In addition, the second liquid delivering port 63 is disposed adjacent to the shaft support 70 located in the second liquid delivering lumen 65. Therefore, the shaft support 70 can be cooled and lubricated by the physiological salt solution from the second liquid delivering port 63.

After the cutting and the aspiration of the lesion area S are completed, the operator presses the switch 53. Accordingly, rotation of the drive shaft 20 is stopped, and the liquid delivery performed by the liquid delivering unit 52 is stopped. Thereafter, the operator removes the medical device 10 from the blood vessel and completes the procedure.

Figure 10:
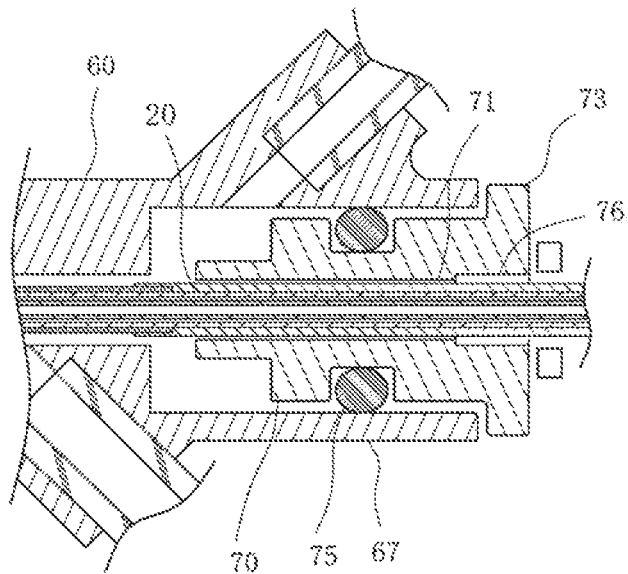
FIG. 10 is an enlarged cross-sectional view showing a part of a handle of a medical device according to a first modification.

A modification of the medical device 10 will be described. As shown in FIG. 10, the medical device 10 according to a first modification includes, at a proximal portion of the support lumen 71, a proximal large-diameter portion 76 having an inner diameter larger than an inner diameter of the support lumen 71. The inner diameter of the proximal large-diameter portion 76 is constant from the proximal end of the support lumen 71 toward the distal side. Since the proximal large-diameter portion (first lumen portion) 76 has the inner diameter larger than that of the support lumen (second lumen portion) 71, the proximal large-diameter portion 76 is not in contact with the drive shaft 20 (i.e., the proximal large-diameter portion 76 is spaced from the drive shaft 20). The drive shaft 20 is in contact with a portion of the support lumen 71 on the distal side of the proximal large-diameter portion 76.

In the medical device 10 including the proximal large-diameter portion 76, when the central axis of the drive shaft 20 is shifted, a position where the rotating drive shaft 20 is in contact with the shaft support 70 is the distal side of the support lumen 71. Since the drive shaft 20 is driven on the proximal side with respect to the shaft support 70, a torque change due to the friction is largely received when the drive shaft 20 is supported at a position on the proximal side of the shaft support 70. Therefore, this leads to the rotational torque loss of the drive shaft 20. On the other hand, since the drive shaft 20 is in contact with the shaft support 70 at a position on the distal side due to the proximal large-diameter portion 76, the drive shaft 20 is easily bent and can be made less susceptible to the torque change due to the friction.

Figure 11:
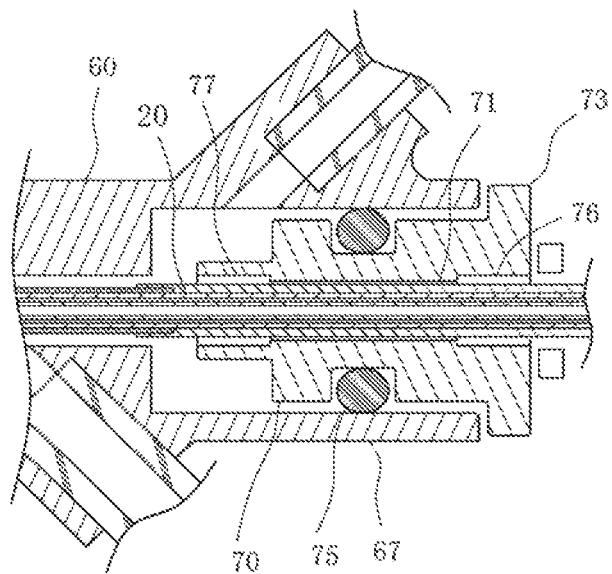
FIG. 11 is an enlarged cross-sectional view showing a part of a handle of a medical device according to a second modification.

As shown in FIG. 11, the medical device 10 according to a second modification includes the proximal large-diameter portion 76, and a distal large-diameter portion 77 having an inner diameter larger than the inner diameter of the support lumen 71 at a portion of the support lumen 71 between the proximal large-diameter portion 76 and the distal large-diameter portion 77. The inner diameter of the distal large-diameter portion 77 is constant from the distal end of the support lumen 71 toward the proximal side. The inner diameter and a length of the distal large-diameter portion 77 are equal to the inner diameter and the length respectively of the proximal large-diameter portion 76. Therefore, the distal large-diameter portion 77 is not in contact with the drive shaft 20.

In a case where the proximal large-diameter portion 76 is provided in the shaft support 70 as in the medical device 10 according to the first modification, when the drive shaft 20 rotates at a high speed, a pressure on a proximal large-diameter portion 76 side, which has a large diameter, is lower than that on the distal side, and a fluid may leak from the distal side to the proximal side of the shaft support 70. On the other hand, by providing the distal large-diameter portion 77 in addition to the proximal large-diameter portion 76, a pressure difference between the proximal side and the distal side of the shaft support 70 is reduced, and the leakage of the fluid can be prevented. In addition, as in the medical device 10 according to the first modification, the rotational torque loss of the drive shaft 20 can be reduced by the proximal large-diameter portion. The proximal large-diameter portion 76 and the distal large-diameter portion 77 may be formed in a tapered shape in which a diameter increases toward an end portion of the shaft support 70.

As described above, the medical device 10 according to the present embodiment includes the drive shaft 20 that is rotatable, the drive unit 51 that is connected to the proximal portion of the drive shaft 20 and rotates the drive shaft 30, the housing 60 that accommodates the proximal portion of the drive shaft 20, and the handle portion 28 that accommodates the drive unit 51 and the housing 60, in which the housing 60 includes the accommodation portion 67 that is provided therein, the shaft support 70 that is disposed in the accommodation portion 67 and has the lumen 71 through which the proximal portion of the drive shaft 20 is inserted, and the elastic body 75 that is disposed between the outer peripheral surface of the shaft support 70 and an inner peripheral surface of the accommodation portion 67, and since the outer diameter of the shaft support 70 is smaller than an inner diameter of the accommodation portion 67, the shaft support 70 is movable in the accommodation portion 67. In the medical device 10 configured as described above, when the drive shaft 20 swings during rotation such that the central axis thereof tilts or moves in parallel, the shaft support 70 can tilt or move with respect to the handle portion 28 following the drive shaft 20. Therefore, the friction between the drive shaft 20 and the shaft support 70 can be reduced, and the rotational torque loss of the drive shaft 20 can be reduced.

In addition, the shaft support 70 includes the recess 72 along a circumferential direction of the outer peripheral surface thereof, and the elastic body 75 may be disposed in the recess 72. Accordingly, in the medical device 10, liquid-tightness between the shaft support 70 and the handle portion 28 can be sufficiently secured, and the shaft support 70 can be easily tilted or moved.

In addition, the recess 72 may have the width larger than that of the elastic body 75. Accordingly, since the elastic body 75 can move in the recess 72, the shaft support 70 can be more easily tilted or moved.

In addition, the shaft support 70 may include the lid portion 73 larger than the inner diameter of the accommodation portion 67 at a proximal portion thereof, and a gap may be provided between the lid portion 73 and a proximal surface of the accommodation portion 67. Accordingly, movement of the shaft support 70 toward the distal side is restricted, and the tilt of the shaft support 70 is not restricted by the lid portion 73.

In addition, the housing 60 may have the liquid delivering port 63 disposed adjacent to a distal side portion of the shaft support 70. Accordingly, the shaft support 70 is cooled and lubricated by the liquid from the liquid delivering port 63, and overheating and wear of the shaft support 70 can be prevented.

In addition, the housing 60 includes, on the proximal side with respect to the proximal surface (proximal end surface) of the shaft support 70, the stopper portions 68 that restrict the movement of the shaft support 70 in the axial direction, and gaps may be provided between the stopper portions 68 and the proximal surface of the shaft support 70. Accordingly, it is possible to prevent the shaft support 70 from falling off from the accommodation portion 67, and to prevent the stopper portions 68 from restricting the tilt of the shaft support 70.

In addition, the support lumen 71 may include, at the proximal portion thereof, the proximal large-diameter portion 76 having the inner diameter larger than the inner diameter of the support lumen 71. Accordingly, when the central axis of the drive shaft 20 is shifted, the position where the drive shaft 20 is in contact with the shaft support 70 is the distal side of the support lumen 71. Since the drive shaft 20 is driven on the proximal side with respect to the shaft support 70, the drive shaft 20 is in contact with the shaft support 70 on the distal side, and thus the drive shaft 20 is easily bent and can be made less susceptible to the torque change due to the friction.

In addition, the support lumen 71 may include, at the distal portion thereof, the distal large-diameter portion 77 having the inner diameter larger than the inner diameter of the support lumen 71. Accordingly, since the proximal side and the distal side of the shaft support 70 respectively have large-diameter portions of the support lumen 71, pressure difference generated when the drive shaft 20 rotates at the high speed is eliminated, and the fluid on the distal side of the shaft support 70 is prevented from leaking to the proximal side.

The detailed description above describes embodiments of a medical device for removing an object in a body lumen representing examples of the new medical device disclosed here. The invention is not limited, however, to the precise embodiments and variations described. Various changes, modifications and equivalents can be effected by one skilled in the art without departing from the spirit and scope of the invention as defined in the accompanying claims. It is expressly intended that all such changes, modifications and equivalents which fall within the scope of the claims are embraced by the claims.

REFERENCE SIGNS LIST 10 medical device
20 drive shaft
22 outer tube shaft
24 cutting portion
26 guide wire lumen tube
27 guide wire lumen
28 handle portion
45 liquid delivering lumen
46 liquid delivering opening portion
47 discharge lumen
50 casing
51 drive unit
52 liquid delivering unit
53 switch
54 operation portion
60 housing
61 discharge port
62 first liquid delivering port
63 second liquid delivering port
64 first liquid delivering lumen
65 second liquid delivering lumen
66 discharge lumen
67 accommodation portion
68 stopper portion
70 shaft support
71 support lumen
72 third recess
73 lid portion
75 third elastic body
76 proximal large-diameter portion
77 distal large-diameter portion
80 seal holding portion
81 holding portion lumen
82 supply port
83 operation fixing portion
85 first recess
87 second recess
90 first elastic body
91 second elastic body
100 first liquid delivering tube
101 second liquid delivering tube
102 suction tube
103 discharge Tube

What is claimed is:
1. A medical device comprising:
a drive shaft that is rotatable, the drive shaft possessing a proximal portion;

a drive unit that is connected to the proximal portion of the drive shaft and that is operable to rotate the drive shaft;
a housing in which is accommodated the proximal portion of the drive shaft;
a handle portion in which is accommodated the drive unit and the housing;
the housing including:
an accommodation portion provided in the handle portion, the accommodation portion possessing an inner peripheral surface and an inner diameter;
a shaft support disposed in the accommodation portion of the housing, the shaft support including a lumen through which the proximal portion of the drive shaft passes, the shaft support possessing an outer peripheral surface and an outer diameter;
an elastic body disposed between the outer peripheral surface of the shaft support and the inner peripheral surface of the accommodation portion; and
the outer diameter of the shaft support being smaller than an inner diameter of the accommodation portion so the shaft support is movable in the accommodation portion.

2. The medical device according to claim 1, wherein the outer peripheral surface of the shaft support includes a circumferentially extending recess facing the inner peripheral surface of the accommodation portion, the elastic body being disposed in the recess.

3. The medical device according to claim 2, wherein the recess has a width larger than a width of the elastic body.

4. The medical device according to claim 3, wherein the shaft support includes a proximal portion at which is located a lid portion having an outer dimension larger than the inner diameter of the accommodation portion, the lid portion of the shaft support having a proximal end surface facing away from the elastic body and a distal end surface facing in a direction opposite the proximal end surface, the accommodation portion possessing a proximal end surface facing the distal end surface of the lid portion of the shaft support, and further comprising a gap between the distal end surface of the lid portion and the proximal end surface of the accommodation portion.

5. The medical device according to claim 4, wherein the housing includes a liquid delivering port disposed adjacent to a distal side portion of the shaft support, the housing also including a liquid delivering lumen extending axially through at least a portion of the housing, the liquid delivering port communicating with the liquid delivering lumen at a location that is on a distal side of the elastic body.

6. The medical device according to claim 5, wherein the housing includes a stopper that is contactable by the shaft support so that contact of the shaft support with the stopper restricts axial movement of the shaft support, the stopper being positioned proximal of a proximal end surface of the shaft support, and a gap between the stopper portion and the proximal end surface of the shaft support.

7. The medical device according to claim 6, wherein the lumen in the shaft support includes, at a proximal portion of the shaft support, a proximal larger-diameter portion having an inner diameter larger than an inner diameter of a portion of the lumen immediately distal of the proximal larger-diameter portion of the lumen.

8. The medical device according to claim 7, wherein the lumen in the shaft support includes, at a distal portion of the shaft support, a distal larger-diameter portion having an inner diameter larger than an inner diameter of a portion of the lumen immediately proximal of distal larger-diameter portion of the lumen.

9. The medical device according to claim 1, wherein the shaft support includes a proximal portion at which is located a lid portion having an outer dimension larger than the inner diameter of the accommodation portion, the lid portion of the shaft support having a proximal end surface facing away from the elastic body and a distal end surface facing in a direction opposite the proximal end surface, the accommodation portion possessing a proximal end surface facing the distal end surface of the lid portion of the shaft support, and further comprising a gap between the distal end surface of the lid portion and the proximal end surface of the accommodation portion.

10. The medical device according to claim 1, wherein the housing includes a liquid delivering port that opens into the accommodation portion at a location that is adjacent a distal portion of the shaft support and that is on a distal side of the elastic body.

11. The medical device according to claim 1, wherein the housing includes a stopper that restricts axial movement of the shaft support, the stopper being positioned on a proximal side of a proximal end surface of the shaft support, with a gap between the stopper and the proximal end surface of the shaft support.

12. The medical device according to claim 1, wherein the lumen in the shaft support through which the proximal portion of the drive shaft passes includes a first lumen portion possessing an inner diameter and a second lumen portion possessing an inner diameter, the first lumen portion being positioned immediately distal of the second lumen portion, and the inner diameter of the first lumen portion being larger than the inner diameter of the second lumen portion.

13. The medical device according to claim 12, wherein the lumen in the shaft support through which the proximal portion of the drive shaft passes includes a third lumen portion possessing an inner diameter, the third lumen portion being positioned immediately distal of the second lumen portion, and the inner diameter of the third lumen portion being larger than the inner diameter of the second lumen portion.

14. The medical device according to claim 1, wherein the shaft support that is movable in the accommodation portion of the housing includes a most distal end portion that is entirely disposed in the accommodation portion of the housing such that the outer peripheral surface of the most distal end portion of the shaft support that is movable in the accommodation portion faces the inner peripheral surface of the accommodation portion.

15. The medical device according to claim 1, wherein the elastic body is a shaft support elastic body, further comprising a seal holding portion and an other elastic body, the seal holding portion being positioned in a portion of the housing, the seal holding portion possessing an outer peripheral surface that faces an inner peripheral surface of the portion of the housing in which the seal holding portion is positioned, the other elastic body being positioned between and in contact with the outer peripheral surface of the seal holding portion and the inner peripheral surface of the portion of the housing in which the seal holding portion is positioned, the other elastic body being positioned on a distal side of the shaft support elastic body.

16. A medical device comprising:
a rotatable drive shaft, the rotatable drive shaft possessing a distal portion and a proximal portion;

a cutter that is fixed to the distal portion of the rotatable drive shaft to rotate together with the rotatable drive shaft and that is configured to cut an object located in a lumen or a cavity of a body;

a motor connected to the proximal portion of the rotatable drive shaft and operable to rotate the rotatable drive shaft and the cutter to cut the object;

a shaft support having a lumen that extends through the shaft support, the proximal portion of the rotatable drive shaft passing through the lumen in the shaft support, the shaft support possessing an outer peripheral surface and an outer diameter;

a housing that includes an accommodation portion, the accommodation portion of the housing defining a space in which the shaft support is positioned, the rotatable drive shaft passing through the accommodation portion of the housing, the accommodation portion possessing an inner peripheral surface;

a handle that is grippable by a user, the motor, the housing and the proximal portion of the rotatable drive shaft being positioned inside the handle, the handle possessing a distal end; and an elastic body disposed between the outer peripheral surface of the shaft support and the inner peripheral surface of the accommodation portion, the elastic body being in contact with the outer peripheral surface of the shaft support and the inner peripheral surface of the accommodation portion, while the outer peripheral surface of the shaft support and the inner peripheral surface of the accommodation portion are spaced from one another so that a gap exists between the outer peripheral surface of the shaft support and the inner peripheral surface of the accommodation portion to allow the shaft support to move in the accommodation portion in a manner causing a central axis of the rotatable drive shaft to shift in the accommodation portion.

17. The medical device according to claim 16, wherein the accommodation portion has an open proximal end, a proximal portion of the shaft support passing through the open proximal end of the accommodation portion so that the proximal portion of the shaft support is positioned outside the accommodation portion and a remainder of the shaft support is positioned inside the accommodation portion.

18. The medical device according to claim 17, wherein the proximal portion of the shaft support includes a lid portion positioned outside the accommodation portion, the lid portion of the shaft support having a proximal end surface facing away from the elastic body and a distal end surface facing in a direction opposite the proximal end surface, the accommodation portion of the housing possessing a proximal end surface facing the distal end surface of the lid portion of the shaft support, the distal end surface of the lid portion and the proximal end surface of the accommodation portion being spaced from one another so that a gap exists between the distal end surface of the lid portion and the proximal end surface of the accommodation portion.

19. The medical device according to claim 16, wherein the shaft support has a proximal end surface facing toward a proximal side, the housing including a stopper that restricts axial movement of the shaft support, the stopper being positioned on the proximal side of the proximal end surface of the shaft support, with a gap between the stopper and the proximal end surface of the shaft support.

20. The medical device according to claim 16, wherein the lumen in the shaft support through which the proximal portion of the rotatable drive shaft passes includes a first lumen portion possessing an inner diameter and a second lumen portion possessing an inner diameter, the first lumen portion being positioned immediately distal of the second lumen portion, and the inner diameter of the first lumen portion being larger than the inner diameter of the second lumen portion.

21. A medical device comprising:
a rotatable drive shaft, the rotatable drive shaft possessing a distal portion and a proximal portion;

a cutter that is fixed to the distal portion of the rotatable drive shaft to rotate together with the rotatable drive shaft and that is configured to cut an object located in a lumen or a cavity of a body;

a motor connected to the proximal portion of the rotatable drive shaft and operable to rotate the rotatable drive shaft and the cutter to cut the object;

a shaft support having a lumen that extends through the shaft support, the proximal portion of the rotatable drive shaft passing through the lumen in the shaft support, the shaft support possessing an outer peripheral surface and an outer diameter;

a housing that includes an accommodation portion in which is positioned the shaft support, the rotatable drive shaft passing through the accommodation portion of the housing, the accommodation portion possessing an inner peripheral surface;

the housing also including a delivery port connectable to a liquid delivering tube to deliver liquid to the delivery port, the housing also including a liquid delivery lumen in communication with the delivery port so that the liquid delivered to the delivery port enters the liquid delivery lumen and flows in a distal direction within the housing, the liquid delivery lumen being positioned distal of the shaft support;

a handle that is grippable by a user, the motor, the housing and the proximal portion of the rotatable drive shaft being positioned inside the handle, the handle possessing a distal end;

an elastic body disposed between the outer peripheral surface of the shaft support and the inner peripheral surface of the accommodation portion, the elastic body being in sealing contact with the outer peripheral surface of the shaft support and the inner peripheral surface of the accommodation portion, the elastic body being positioned proximal of the liquid delivery lumen and the delivery port so that the liquid entering the liquid delivery lumen by way of the delivery port is prevented from flowing proximally beyond the elastic body; and the outer peripheral surface of the shaft support and the inner peripheral surface of the accommodation portion being spaced from one another so that a gap exists between the outer peripheral surface of the shaft support and the inner peripheral surface of the accommodation portion to allow the shaft support to move in the accommodation portion in a manner causing a central axis of the rotatable drive shaft to shift in the accommodation portion.

22. The medical device according to claim 21, wherein the lumen in the shaft support through which the proximal portion of the rotatable drive shaft passes includes a first lumen portion possessing an inner diameter and a second lumen portion possessing an inner diameter, the first lumen portion being positioned immediately distal of the second lumen portion, and the inner diameter of the first lumen portion being larger than the inner diameter of the second lumen portion.

* * * * *